United States Patent [19]

Maruyama

[11] Patent Number: 4,550,994
[45] Date of Patent: Nov. 5, 1985

[54] FOCUSING CONTROL DEVICE
[75] Inventor: Takashi Maruyama, Suwa, Japan
[73] Assignee: Chinon Kabushiki Kaisha, Nagano, Japan
[21] Appl. No.: 282,142
[22] Filed: Jul. 10, 1981
[30] Foreign Application Priority Data
   Aug. 6, 1980 [JP] Japan .................. 55-107899
[51] Int. Cl.$^4$ .................................. G03B 3/10
[52] U.S. Cl. .................... 354/402; 352/140
[58] Field of Search .......... 354/25 R, 25 A, 25 P, 354/25 N, 31 F, 195, 402; 352/140; 318/640
[56] References Cited
U.S. PATENT DOCUMENTS
  4,251,145  2/1981  Cocron et al. ............... 354/31 F
  4,303,321 12/1981  Enomoto et al. ............ 354/25
  4,314,187  2/1982  Cocron ...................... 318/640 X Primary Examiner—William B. Perkey
Attorney, Agent, or Firm—Murray, Whisenhunt & Ferguson

[57] ABSTRACT

An automatic focusing device for a cine camera operates so that the speed at which the lens is moved to its optimum focusing position decreases as a perfect focus is reached. A comparator determines how far out of focus the system is, and a pulse width modulator provides a zero to 100% energization signal to the servo control circuit. The farther the system is out of focus, the larger percentage energization signal from the pulse width modulator and the faster the lens will be moved toward the optimum position.

4 Claims, 4 Drawing Figures

FOCUSING CONTROL DEVICE

BACKGROUND OF THE INVENTION

This invention relates to an automatic focusing device for a cine camera or the like in which the lens is moved to a focused position with the aid of range finding signals that the lens is continuously in focused condition.

An example of a focusing system to which the improvement according to the invention is applicable is shown in U.S. Pat. No. 4,251,145 to Cocron, et al.

In general, an automatic focusing device of this type employs a motor to move the photographing lens to the optimum focused position and the speed of the motor is controlled by varying an electrical energization percentage for the motor, i.e. an energization pulse width.

Heretofore, the pulse width is determined according to the amount of shift of the lens. However, if the lens is moved to the focusing position at a predetermined rate irrespective of the depth of field in the photographing operation, then the resultant picture is unsatisfactory.

SUMMARY OF THE INVENTION

It is therefore an object of the present invention to provide a focusing control device in which, in the case where the lens is positioned out of the depth of field, the motor is energized with a pulse width of 100% so that the lens will be quickly moved into the range of field depth wherein the image is recognized clear, and in the case where the lens is already located within the depth of field, the ratio of the amount of shift of the lens from the optimum focusing position to the width of the range of field depth is detected, so that the motor can be energized intermittently with a pulse width in this ratio, so the lens will be slowly moved to the correct focusing position, whereby the focus is varied slowly.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENT

Figure 1:
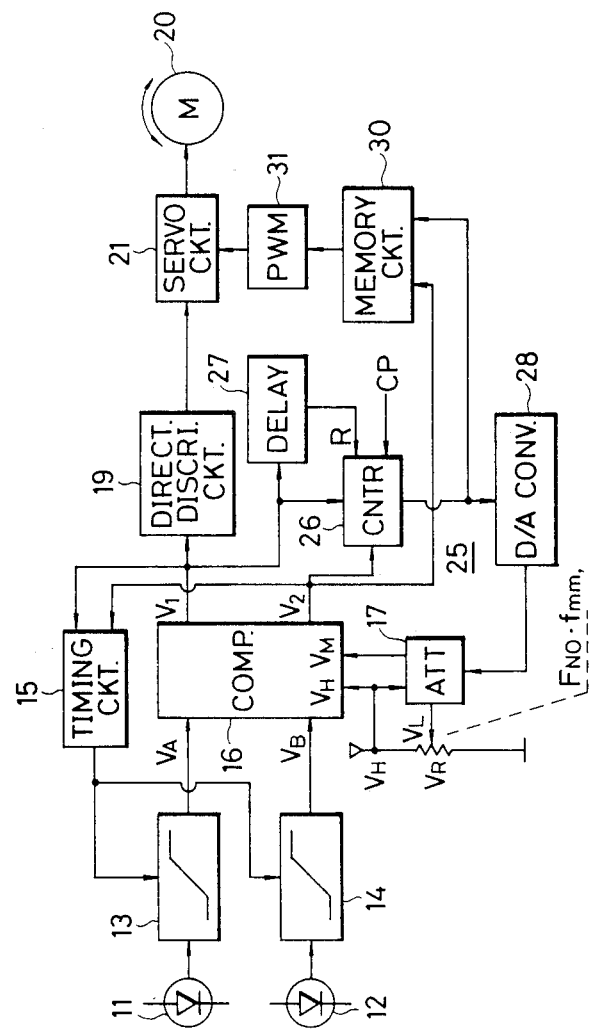
FIG. 1 is a circuit block diagram showing one example of a focusing control device according to this invention.

FIG. 1 shows the technical concept of the invention wherein a focusing device utilizes a so-called "active system" in which the light that is applied to the object to be photographed is reflected back from the object to the system.

A range finding optical system is so designed that when the photographing lens is focused the object, the reflected light is equally received by two light receiving elements 11 and 12. In the case of a front focusing condition, a larger part of the reflected light is received by the light receiving element 11, and in the case of a rear focusing condition, a larger part of the reflected light is received by the light receiving element 12. The outputs of the light receiving elements 11 and 12 are subjected to integration in integrators 13 and 14, respectively.

In the arrangement described above, as the location of the lens is shifted from the optimum focusing position, the difference between the two integration values VA and VB is increased. As the lens approaches the optimum focusing position, the difference between the two integration values VA and VB is decreased. In the case of the front focusing condition, the integration value VA is larger than the integration value VB, while in the case of the rear focusing condition, the value VA is smaller than the value VB. Starting, stopping and releasing the integration operations of the two integrators 13 and 14 are controlled by a timing circuit 15. The two integration values VA and VB are applied to a comparator 16, where they are compared with two threshold values VH and VM. The threshold value VH is set to a predetermined voltage level. The threshold value VM is so controlled by an attenuator 17 that it varies at a predetermined variation rate between the threshold value VH and an additionally predetermined threshold value VL. The threshold value VL in combination with the threshold value VH determines a depth of field (VH−VL), and it is varied according to the aperture value FNO, one of the factors which defines a depth of field according to the focal length of the lens. The variation of the threshold value VL is carried out by a variable resistor VR.

When the larger of the input integration values VA and VB reaches the threshold value VH, the comparator 16 produces an output signal V1. The output signal V1 is applied to a direction discriminating means comprising circuit 19. Upon reception of the output signal V1, the circuit 19 discriminates which one of the integration values VA or VB has reached the threshold value VH, thereby determining the direction of rotation of the drive motor 20. More specifically, if the integration value VA reaches the threshold value VH, the direction discriminating circuit 19 determines that the lens is in the front focusing condition, and provides an instruction signal to cause the focus of the lens to move away. In contrast, if the integration value VB reaches the threshold value VH, the circuit 19 determines that the lens is in the rear focusing condition, and provides an instruction signal to cause the focus of the lens to come near. Upon reception of the instruction signal from the direction discriminating circuit 19, a servo control circuit 21 operates to rotate the lens drive motor 20 in the direction specified by the instruction signal.

The aforementioned output signal V1 is applied, as an integration stopping instruction signal, to the timing circuit 15.

The output signal V1 is further applied to a clocking unit, or a hexadecimal counter 26, forming a shift range detecting means comprising section 25. At the same time, the output signal V1 is applied through a delay circuit 27 to the counter 26, to serve as a start signal and a reset signal. The counter 26 counts clock pulses CP in the conventional manner. The count value of the counter 26 is reset to "0000" by the reset signal, and it reaches the maximum value "1111" with the fifteenth clock pulse. The count value of the counter 26 is converted into an analog signal by a D/A (digital to analog) converter 28, whose output is applied to the attenuator 17. The attenuator 17 controls the threshold value VM in such a manner that VM varies at a predetermined variation rate between the thresholds VH and VL for a period of time corresponding to fifteen clock pulses.

The comparator 16 produces an output signal V2 when the threshold value VM becomes equal to, the threshold value VL or when, before that in time, the threshold value VM becomes equal to the smaller of the integration values, which has not reached the threshold value VH yet. The output signal V2 is applied, as an integration releasing signal, to the timing circuit 15 and is applied, as a stop signal, to the counter 26.

A memory circuit 30 receives the count value of the counter 26. Whenever the output signal V2 is produced by the comparator 16, the content of the memory circuit 30 is rewritten to a new count value. A pulse width determining means comprising circuit 31 determines a pulse width utilized for energizing the lens drive motor 20 according to the percentage of the count value stored in the memory circuit 30 with respect to the maximum count value "1111" of the counter 26.

Figure 2A:
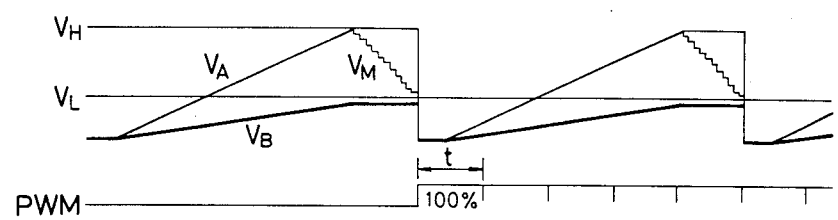
FIGS. 2a, 2b, and 2c are waveform diagrams describing the operation of the focus control device of the invention under various focusing conditions.
Figure 2B:
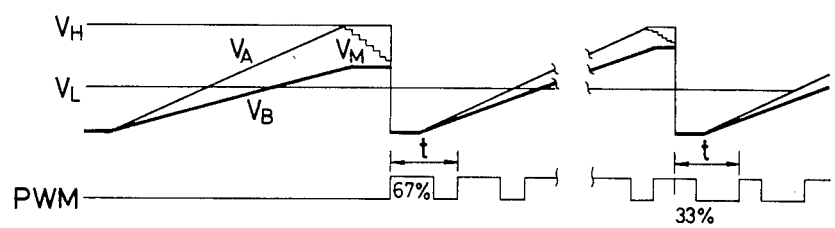
Figure 2C:
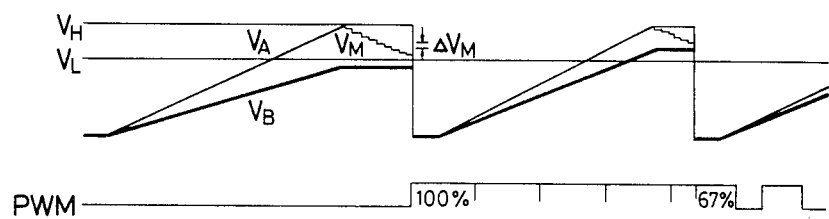

The operation of the circuitry thus organized will be described with reference to FIGS. 2a to 2c. First, the case where the lens is in the front focusing condition and the focus point of the lens is out of the depth of field, the integration value VA is larger than the integration value VB. Therefore, as shown in FIG. 2a, the integration value VA first reaches the threshold value VH, and at this instant in time the integration value VB did not reach the threshold value VL yet. As the integration value VA has reached the threshold value VH as described above, the comparator 16 provides the output signal V1, as a result of which the integration operation is stopped and the counter 26 is started. That is the counter 26 starts counting the clock pulse CP, and the count value of the counter 26 is applied through the D/A converter 28 to the attenuator 17. Therefore, the attenuator 17 varies the threshold value VM from the threshold value VH towards the threshold value VL from when the counter 26 starts counting the clock pulses, i.e., from when the integration value VA reaches the threshold value VH. This variation rate is so controlled that it is maintained unchanged for the time interval which elapses from the instant in time that the integration value VA reaches the threshold value VH until the count value of the counter 26 reaches the maximum value "1111", i.e., until the fifteenth clock pulse CP is counted.

The threshold value VM changes with time as described above; however, as the integration value VB has not reached the threshold value VL, the threshold value VM reaches the threshold value VL. When the threshold value VM becomes equal to the threshold value VL, the output signal V2 is produced to release the integration operation and to stop the counter 26.

The counter 26 operates to obtain, with the aid of its count value, the difference (VH−Vx, where Vx is the smaller of VA and VB) between the threshold value VH and the smaller integration value VB (the smaller value in this example) when the larger integration value VA (in this example) has reached the threshold value VH; however, in the case where the smaller integration value VB has not reached the threshold value VL, the maximum count value "1111" corresponding to (VH−VL) is provided. This count value is stored in the memory circuit 30 with the aid of the output signal V2 and is applied to the pulse width determining circuit 31. The pulse width determining circuit 31 determines an electrical energization percentage according to the ratio of (VH−Vx) to (VH−VL), i.e. the ratio of the output value of the memory circuit 30 to the maximum count value "1111" of the counter 26. Therefore, when the counter 26 counts the maximum value "1111" corresponding to (VH−VL), the electrical energization percentage with respect to the electrical energization time in one cycle is 15/15, or 100%.

Accordingly, the motor 20 is energized 100% in the next integration period so as to be rotated in a direction specified by the direction discriminating circuit 19. This operation is continued until the lens is focused to have the aimed depth of field.

The case where the aimed depth of field is obtained, but the lens is somewhat in the front focusing condition will be described with reference to FIG. 2b. In this case, when the larger integration value VA reaches the threshold value VH, the smaller integration value VB has exceeded the threshold value VL. Therefore, if, when the counter 26 counts the tenth clock pulse, i.e. when the count value reaches "1010", the threshold value VM becomes equal to the integration value VB, the comparator 16 provides the output signal V2 to stop the counting operation of the counter 26, and the count value "1010" is stored in the memory circuit 30. The pulse width determining circuit 31 determines the electrical energization percentage according to the ratio of the actual count value "1010" to the maximum count value "1111". In this case, the percentage is 67%, with the ratio being 10/15. Thus, the motor 20 is energized with an electrical energization percentage of 67%. Therefore, the speed of the motor 20 is decreased, and the lens is slowly moved towards the focusing position. If the difference between the integration values VA and VB is further decreased; that is, if, when for instance the fifth clock pulse is inputted, the threshold value VM reaches the integration value VB, then the electrical energization percentage is set to 33% with the ratio being 5/15, because the count value of the counter 26 is "0101". Thus the motor is rotated still more slowly.

As is apparent from the above description, the speed of the motor 20 is decreased as the lens approaches the focusing position. That is, when the focusing is out of the depth of field, the motor 20 is energized with an electrical energization percentage of 100% and therefore it is operated at the highest speed. On the other hand, when the focusing is in the depth of field, the depth of field is divided into fifteen parts, and the speed of the motor is changed according to the degree of deviation thereof.

Furthermore, in the case also where the depth of field (VH−VL) is decreased because a zoom lens is used or the aperture value is changed, the depth of field is divided into fifteen equal parts, and the speed of the motor is determined according to the degree of deviation thereof, similarly as in the above-described case. Whenever one clock pulse is applied, the level of the threshold VM is decreased as much as ΔVM. When the depth of field (VH−VL) is decreased to a half, the data ΔVM is also decreased to a half. Accordingly, even if the depth of field (VH−VL) is changed, the speed of the motor 20 is changed in fifteen steps (or sixteen steps if the stop is included) at all times.

While the case where the lens is in the front focusing condition has been described, the case where the lens is in the rear focusing condition can be similarly described by swapping the integration values VA and VB with each other.

In the above-described embodiment, the hexadecimal counter is employed as the clocking unit 26; however, the invention is not limited thereto or thereby.

As was described above, according to the invention, when the lens is positioned out of the depth of field, the motor is rotated at the full speed so that the lens is quickly moved to be in the depth of field, and accordingly the period of time for which the image is unclear can be reduced. When the focusing is in the depth of field, the electrical energization time is changed according to the ratio of the depth of field to the deviation of the present position of the lens from the optimum focusing position, thereby to control the speed of the motor. Accordingly, as the lens approaches the optimum focusing position, the speed of movement of the lens is decreased. Therefore, if the technical concept of the invention is applied to a cine camera, a motion picture can be obtained in which the variations in picture due to the focus controlling operation are acceptable.

While the invention has been described with reference to its preferred embodiment the technical concept of the invention is applicable to all the focusing devices in which the integration values in two systems are subjected to comparison and discrimination.

What is claimed is:

1. In a lens focusing device of the type having first and second range finding elements for generating first and second signals, first and second integrator circuits respectively receiving said first and second signals and providing outputs relative to one another according to the state of focus, the output of said first integrator circuit being larger than the output of said second integrator circuit in the case of a front focusing condition and the output of said second integrator circuit being larger than the output of said first integrator circuit in the case of a rear focusing condition, and a direction discriminating means, responsive to the outputs of said first and second integrator circuits, for determining the direction of rotation of a lens drive motor, the improvement comprising the combination of shift range detecting means, responsive to said direction discriminating means, for detecting a difference (VH−Vx) between a first predetermined threshold value (VH) first reached by the larger of the outputs of said first and second integrator circuits and the smaller value (Vx) of the outputs of said first and second integrator circuits; and pulse width determining means, responsive to said shift range detecting means, for determining a pulse width utilized for energizing said lens drive motor in the ratio of said difference (VH−Vx) to a difference (VH−VL) between said threshold value (VH) and a second threshold value (VL).

2. A lens focusing device as recited in claim 1 wherein said shift range detecting means comprises a comparator circuit connected to receive the outputs of said first and second integrator circuits and produce a first output when the larger one of said outputs reaches said first predetermined threshold value (VH), means for generating a third variable threshold value (VM) which is supplied to said comparator circuit, said third threshold value (VM) varying at a predetermined rate from said first predetermined threshold value (VH) to said second threshold value (VL), and said comparator circuit producing a second output when said third variable threshold value (VM) becomes equal to the smaller one of the outputs of said first and second integrating circuits, and clocking means, started by the first output and stopped by the second output of said comparator circuit, for clocking the period of time required for said third variable threshold value (VM) to become equal to the smaller one of the outputs of said first and second integrating circuits.

3. A lens focusing device as recited in claim 1 or 2 wherein said second threshold value (VL) is variable according to the depth of field.

4. A lens focusing device as recited in claim 2 wherein said pulse width determining means comprises memory means for storing a value corresponding to the time period clocked by said clocking means.

* * * * *